Figure 1:
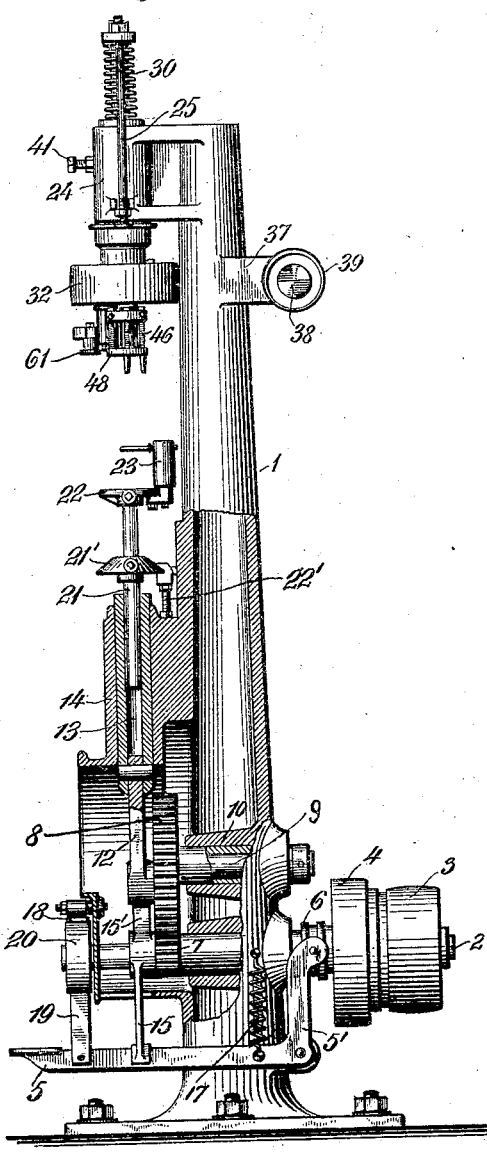

No. 891,511. PATENTED JUNE 23, 1908.
A. L. WEISSENTHANNER.
BOTTLE SEALING MACHINE.
APPLICATION FILED MAY 10, 1905.

11 SHEETS—SHEET 1.

Witnesses
Grace L. Heasley
Harry Schrage

Inventor
Alfred L. Weissenthanner
By his Attorney Charles B. Jones.

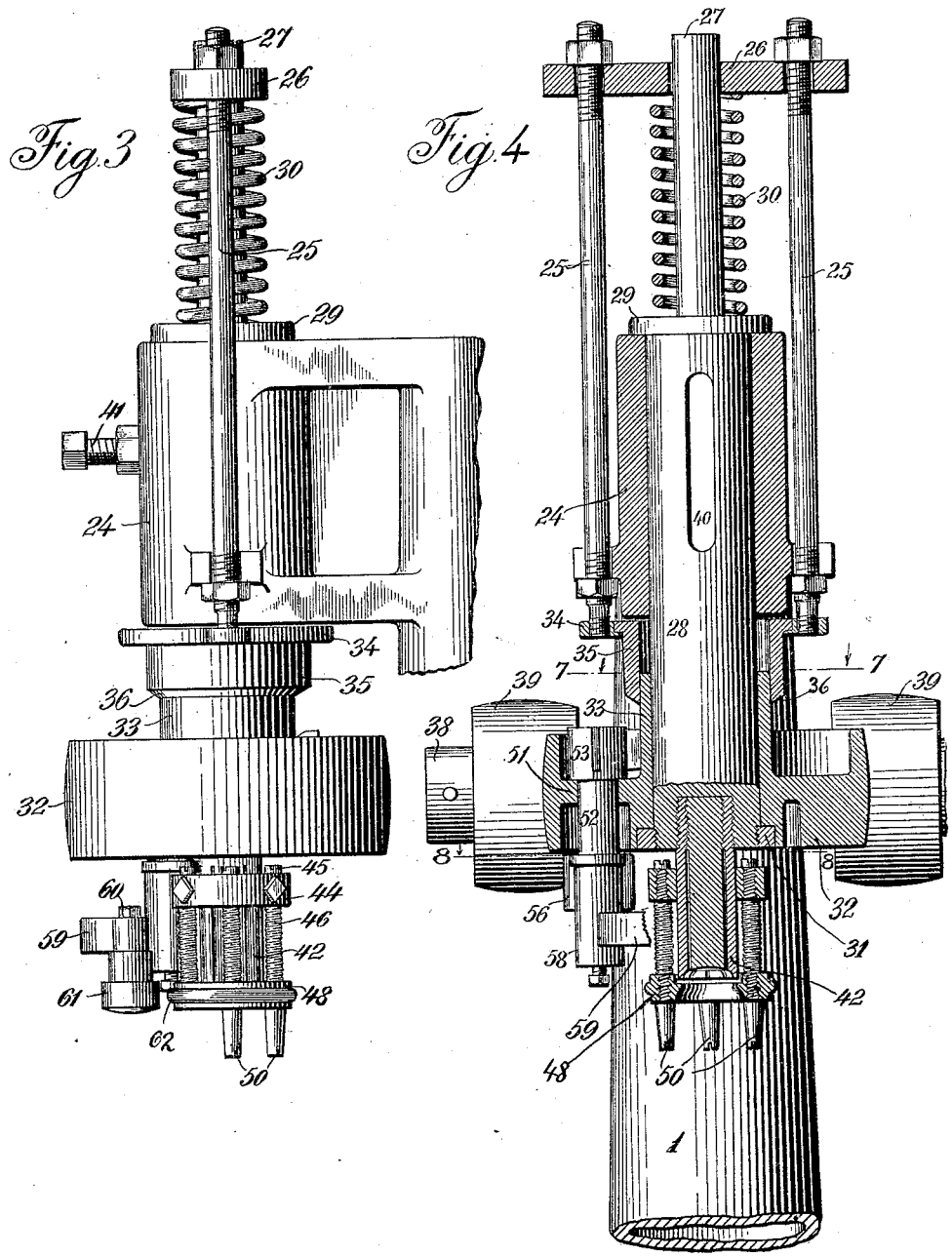

No. 891,511. PATENTED JUNE 23, 1908.
A. L. WEISSENTHANNER.
BOTTLE SEALING MACHINE.
APPLICATION FILED MAY 10, 1905.
11 SHEETS—SHEET 3.
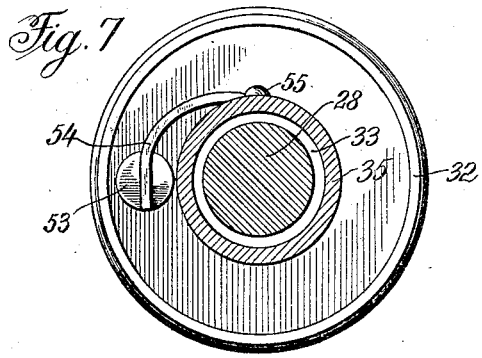
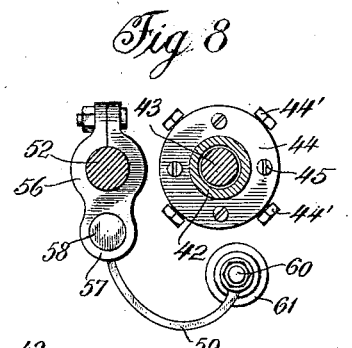
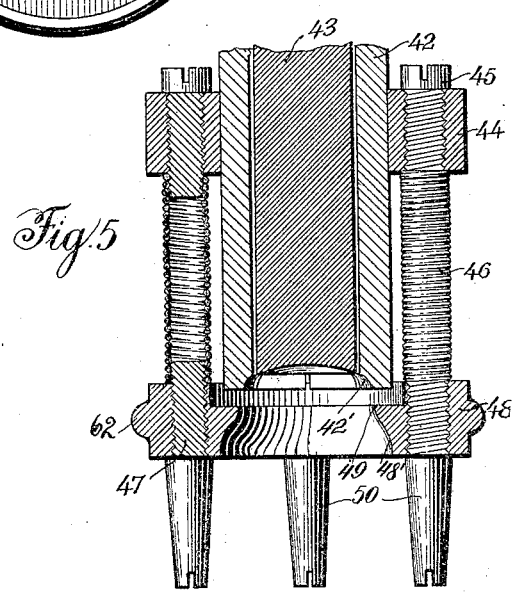
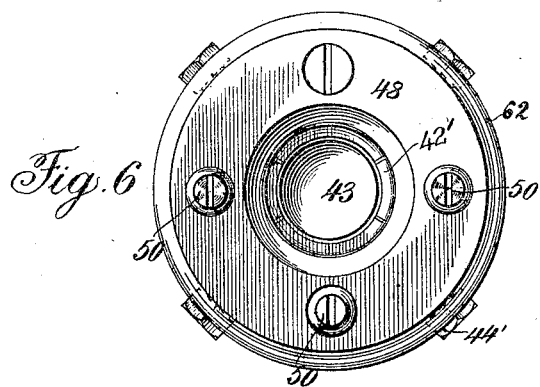

No. 891,511. PATENTED JUNE 23, 1908.
A. L. WEISSENTHANNER.
BOTTLE SEALING MACHINE.
APPLICATION FILED MAY 10, 1905.
11 SHEETS—SHEET 4.
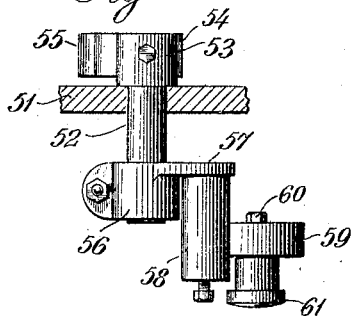
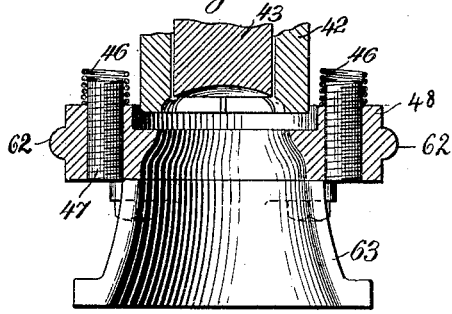
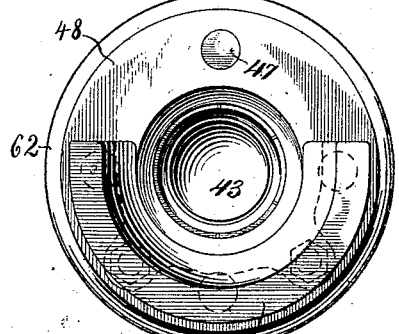
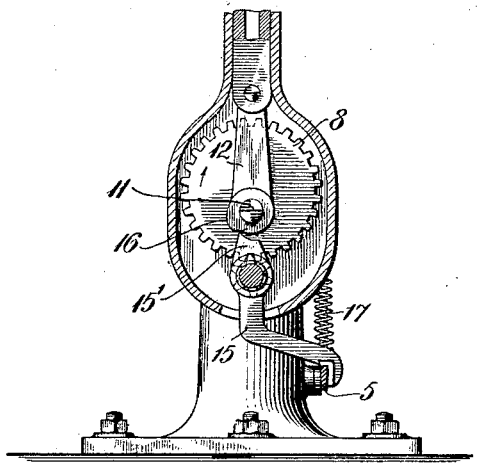

No. 891,511.
PATENTED JUNE 23, 1908.
A. L. WEISSENTHANNER.
BOTTLE SEALING MACHINE.
APPLICATION FILED MAY 10, 1905.
11 SHEETS—SHEET 5.
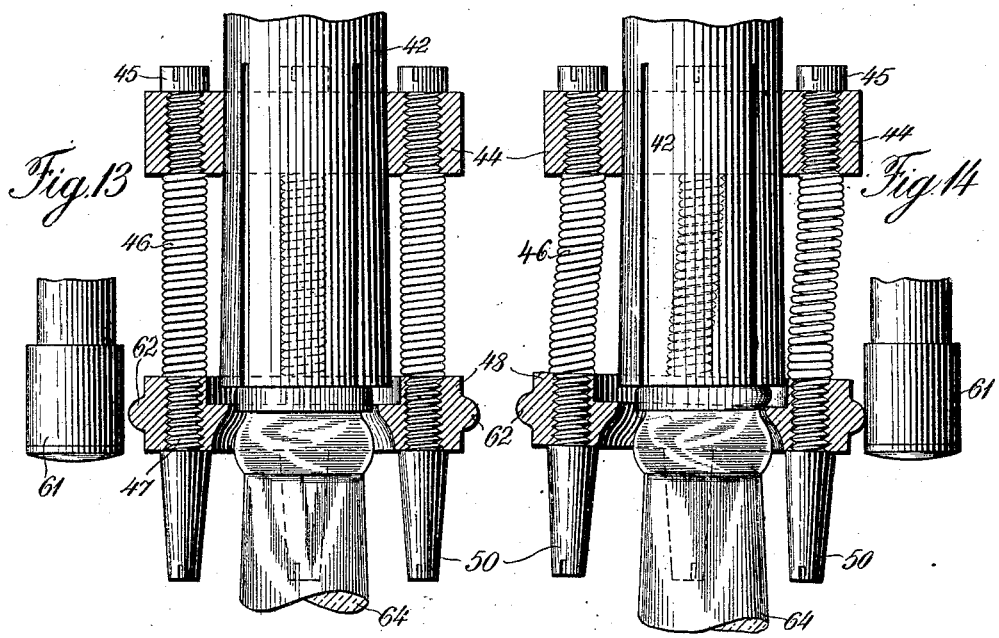
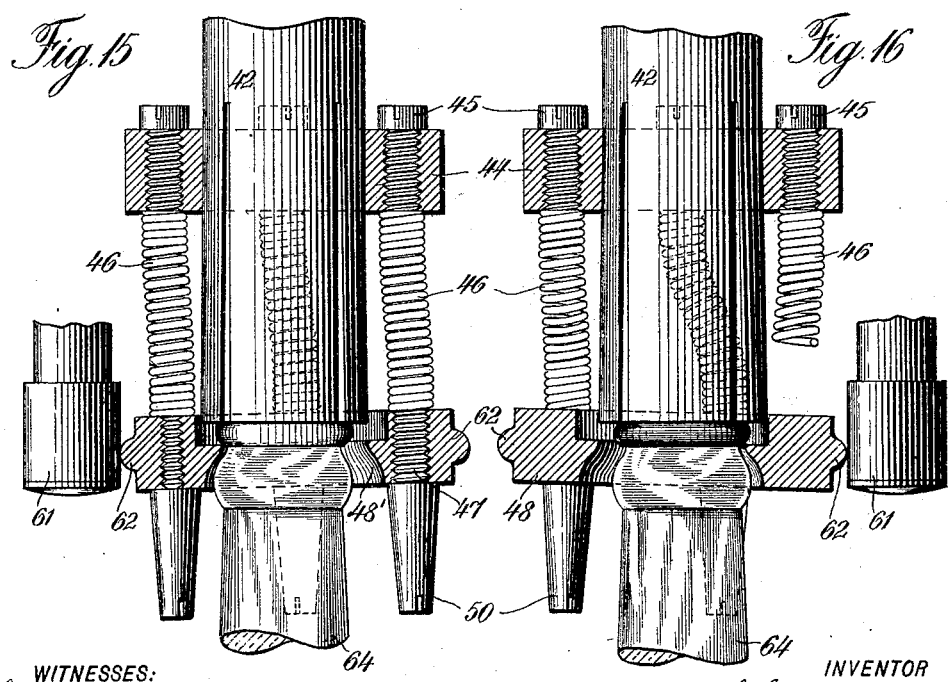
WITNESSES:
INVENTOR
BY ATTORNEY No. 891,511.
PATENTED JUNE 23, 1908.
A. L. WEISSENTHANNER.
BOTTLE SEALING MACHINE.
APPLICATION FILED MAY 10, 1905.
11 SHEETS—SHEET 6.
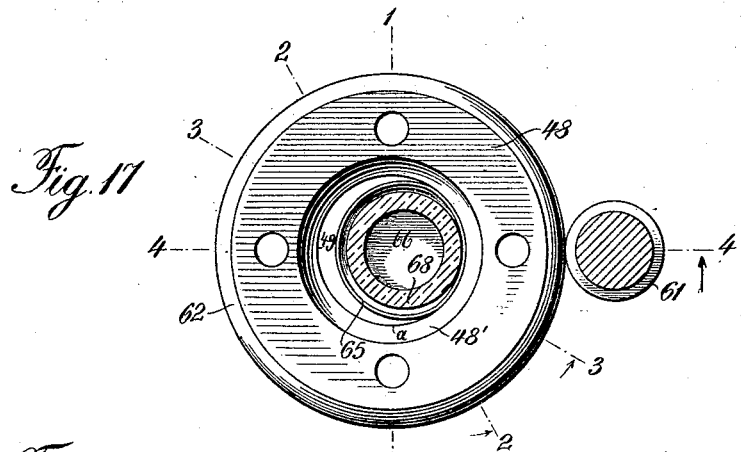
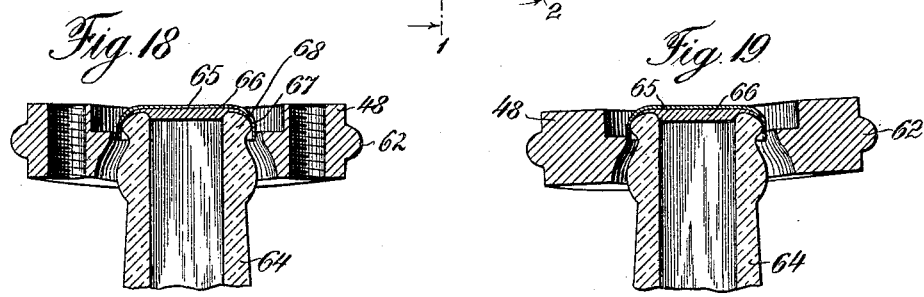
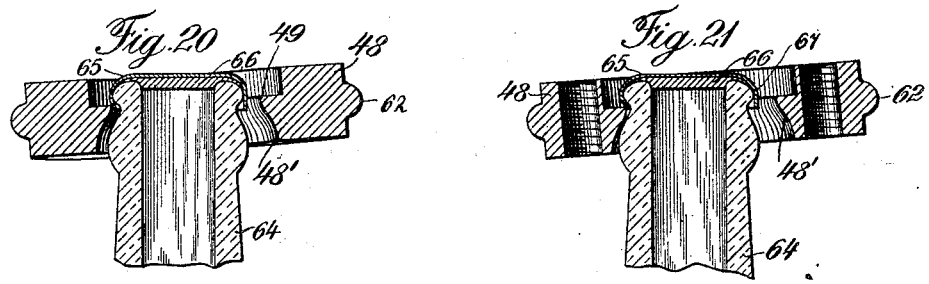
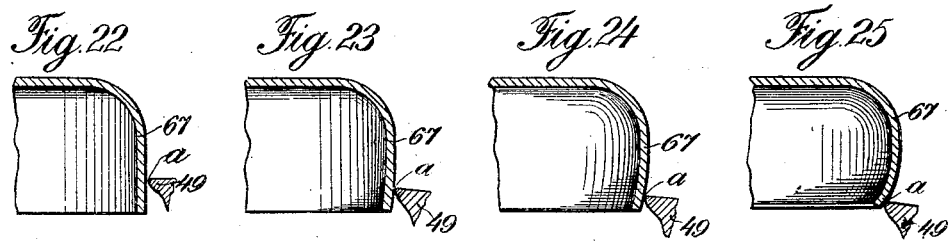
WITNESSES:
Grace P. Heasley
Harry Schrag
INVENTOR
Alfred L. Weissenthanner
BY his ATTORNEY
Charles Jones

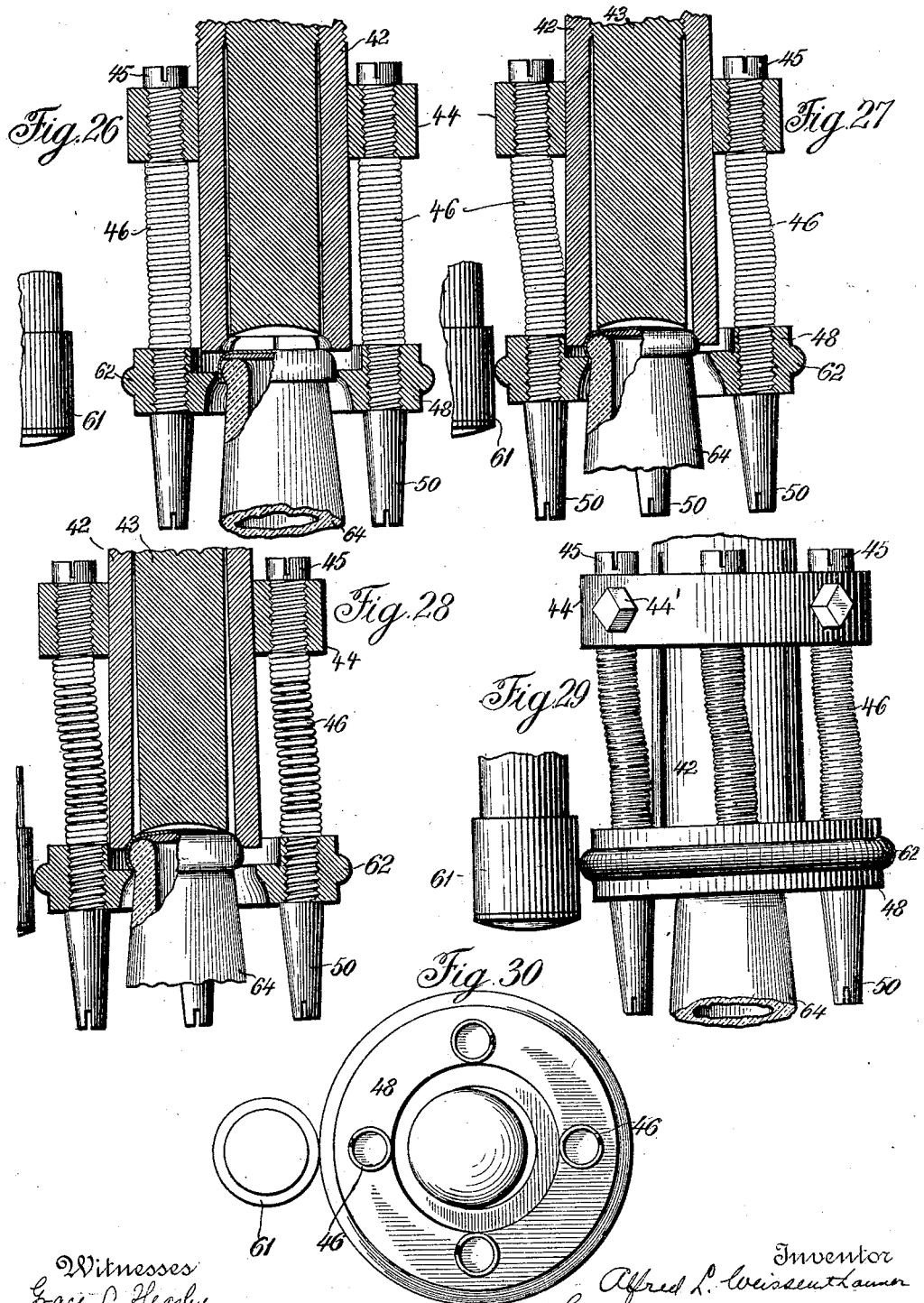

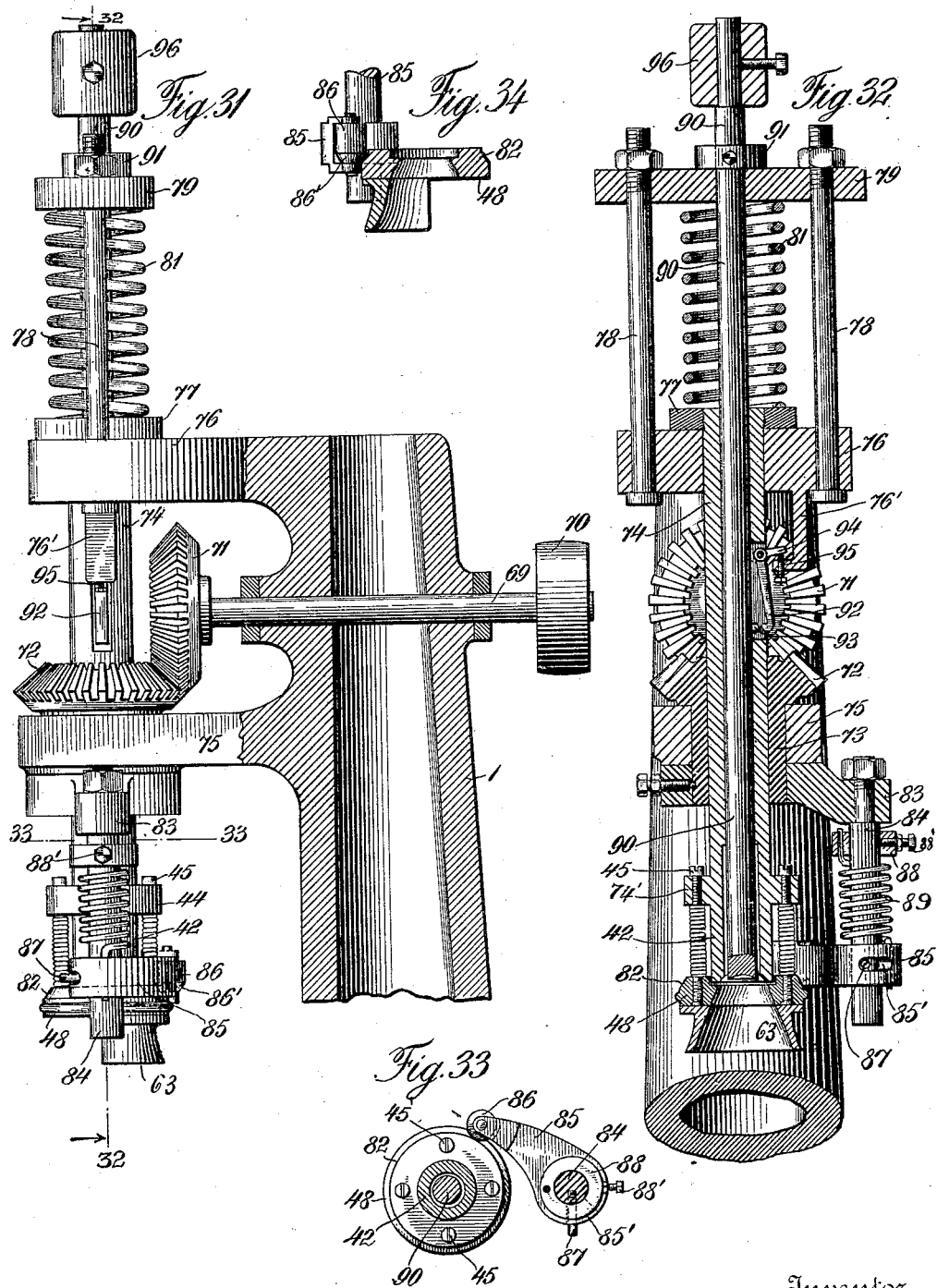

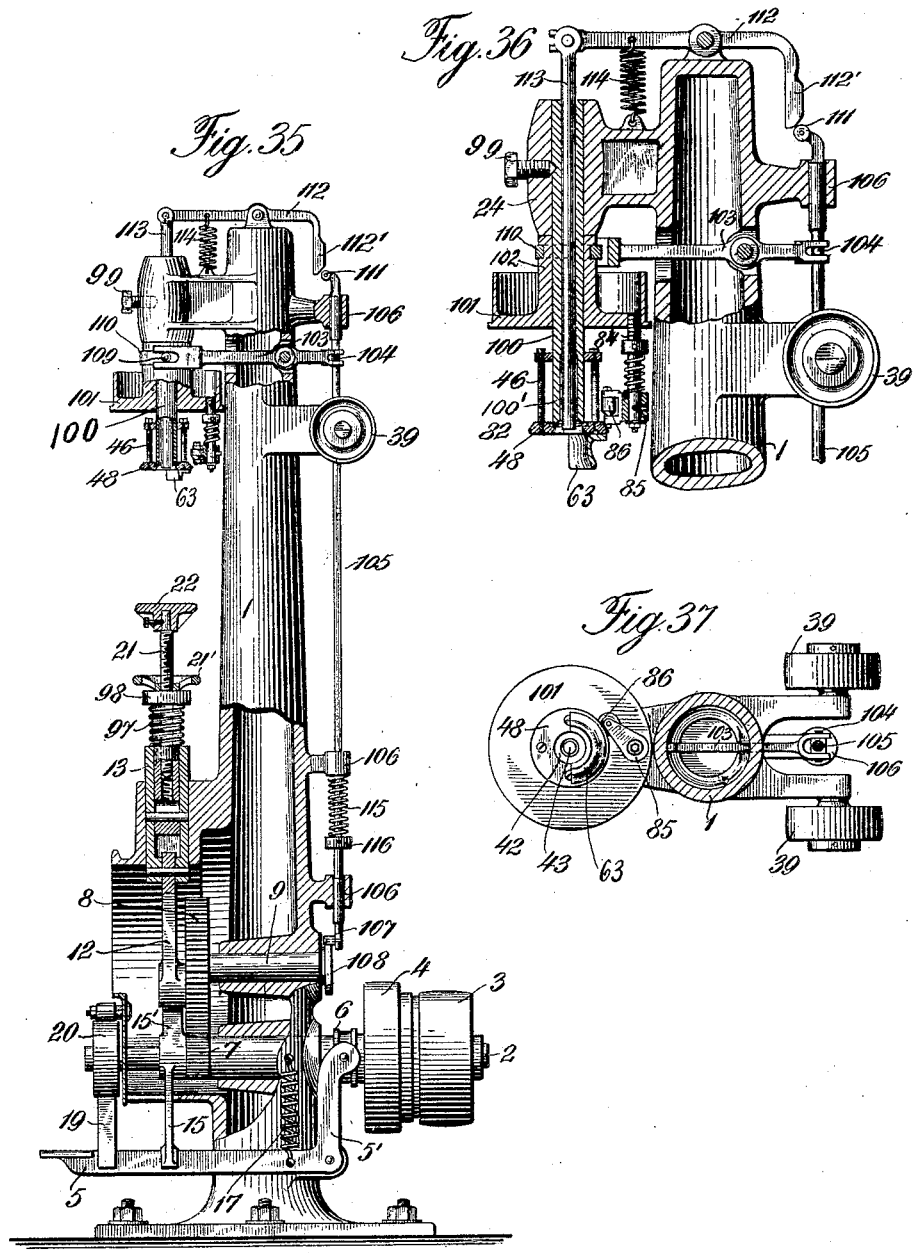

No. 891,511.
PATENTED JUNE 23, 1908.
A. L. WEISSENTHANNER.
BOTTLE SEALING MACHINE.
APPLICATION FILED MAY 10, 1905.
11 SHEETS—SHEET 10.
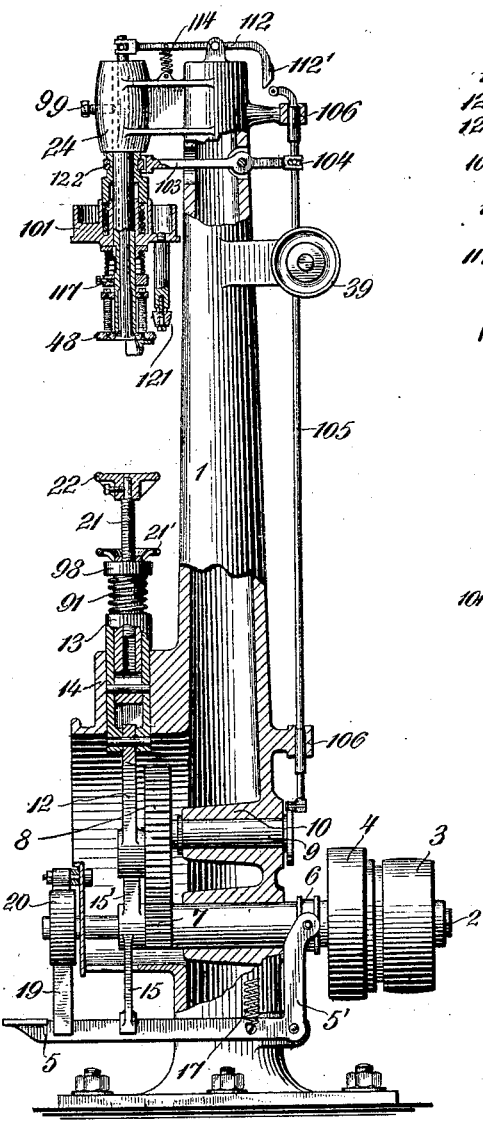
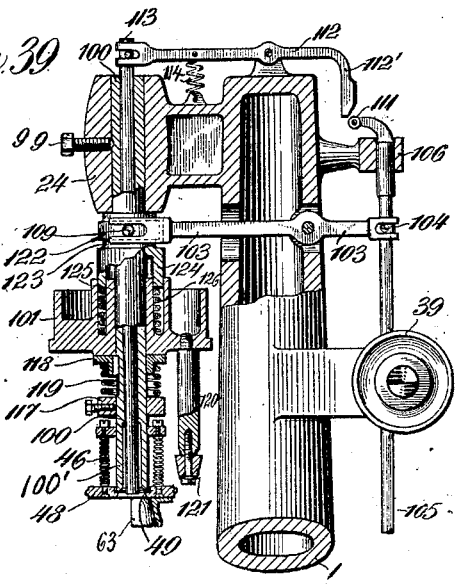
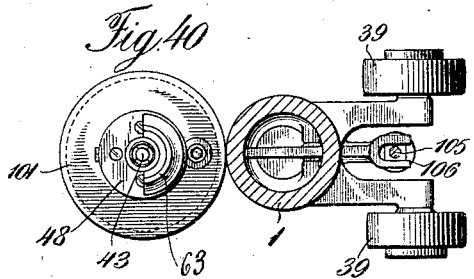
Witnesses
Grace L. Heasley
Harry Schnage
Inventor
Alfred L. Weissenthanner
By his Attorney
Charles O. Jones No. 891,511. PATENTED JUNE 23, 1908.
A. L. WEISSENTHANNER.
BOTTLE SEALING MACHINE.
APPLICATION FILED MAY 10, 1905.
11 SHEETS—SHEET 11.
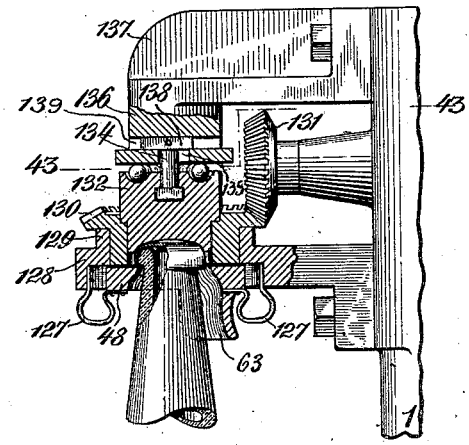
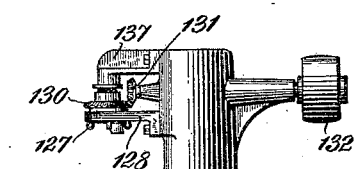
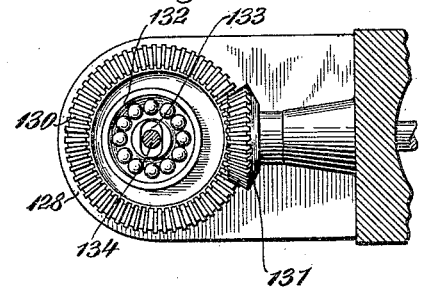
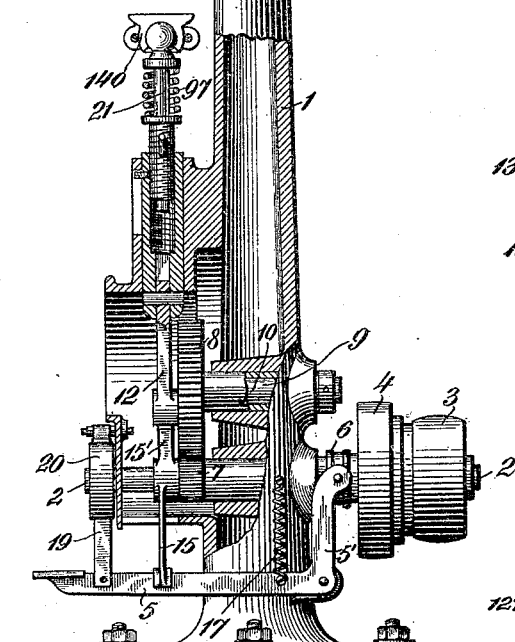
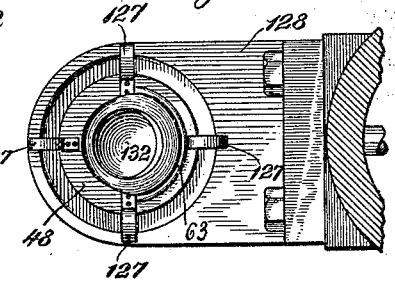
Witnesses
Grace L. Heasley
Harry Schnage
Inventor
Alfred L. Weissenthanner
By his Attorney
Charles D. Jones

UNITED STATES PATENT OFFICE.

ALFRED L. WEISSENTHANNER, OF NEW YORK, N. Y.

BOTTLE-SEALING MACHINE.

No. 891,511.  Specification of Letters Patent.  Patented June 23, 1908.

Application filed May 10, 1905. Serial No. 259,716.

*To all whom it may concern:*

Be it known that I, ALFRED L. WEISSENTHANNER, a citizen of the Republic of France, and a resident of New York city, State of New York, have invented a certain new and useful Improvement in Bottle-Sealing Machines, of which the following is a specification.

The present invention relates to a machine for capping bottles or like receptacles having an annular shoulder or bead about the head, the object of the invention being to construct a machine which will reshape the cap to conform to the contour of the rim of the bottle, and bend the flange of the cap into locking contact with the shoulder of the bottle head to effect a practically permanent seal.

To effect the reshaping of the cap I employ a chuck comprising laterally yielding spring jaws into which the bottle head is forced. In the particular embodiment of the invention illustrated in the drawings the yielding chuck is supported by the head of the machine frame in alinement with a reciprocating table, upon which the bottle is supported, the upward movement of the table forcing the bottle head into the chuck in such manner as to apply a uniform and evenly distributed pressure upon the corner of the cap for the purpose of reshaping the cap to conform to the rim of the bottle thus providing fully for the ordinary variations in the form and size of caps and bottles.

The bending of the flange of the cap takes place in the operation of the machine immediately after the reshaping above referred to. The mechanism for accomplishing this second operation upon the cap comprises a bending or sealing tool by which the cap flange is bent into locking engagement with a shoulder on the bottle head by a gradually increasing and progressively applied inward and downward pressure upon said flange. This result is effected by a relative rolling movement between the bottle and bending tool while in an eccentric relation one to the other, the parts being so related that the point of application of the pressure begins above the edge of the flange and continues with a shearing movement inwardly and downwardly to the point of maximum pressure at or near the lower edge of the flange. During this movement the bottle may be held stationary between the supporting table and the chuck and the tool moved from its normal concentric position to an eccentric position with the working edge of the tool bearing against the cap flange. Or the bottle may be moved from its normal concentric position to a position eccentric to the bending tool and then moved about the working edge of the bending tool so that successive points of the cap flange will be acted upon to effect the desired bending into locking engagement with the bottle shoulder. Or both bottle and tool may be moved during the flange bending operation, the essential feature of this part of my invention consisting in providing means for imparting a relative movement between the bottle and the bending tool while maintained in an eccentric position one to the other.

In the following specification I have used the word "bottle" for convenience of description as meaning any form of receptacle having a shoulder or bead about its head, the application of the invention not being confined specifically to the capping of bottles.

Figure 2:
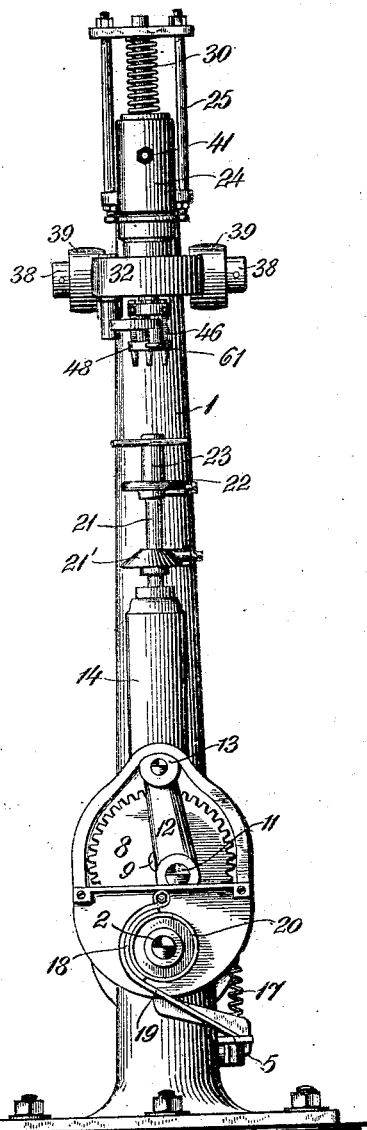

The invention will be understood by reference to the accompanying drawings in which Figure 1 is a side elevation of the machine embodying one form of the invention certain of the parts being shown in section; Fig. 2 is a front elevation thereof; Fig. 3 is an enlarged side elevation of the head of the machine of Fig. 1; Fig. 4 is an enlarged front elevation of the head of the machine partly in section; Fig. 5 is an enlarged sectional view of the lower end of the chuck and of the flange bending tool; Fig. 6 is an inverted plan view of the chuck and bending tool; Fig. 7 is a sectional view on the plane of the line 7—7 of Fig. 4; Fig. 8 is a sectional view on the plane of the line 8—8 of Fig. 4; Fig. 9 is a detail view of the means for forcing the sealing or bending tool against the cap flange; Fig. 10 is a detail view of a modified form of bottle guide fixed to the sealing tool; Fig. 11 an inverted plan view of Fig. 10; Fig. 12 a detail view of the means for locking and unlocking the foot treadle; Figs. 13, 14, 15 and 16 are enlarged vertical detail views of the sealing tool intended to illustrate the positions of the several parts during the successive steps of the flange bending operation; Fig. 17 an inverted plan view of the sealing tool showing the neck of the bottle in section; Figs. 18, 19, 20 and 21 are vertical sectional views on the plane of the lines 1—1, 2—2, 3—3, and 4—4, respectively of Fig. 17 looking in the direction of the arrows; Figs.

22, 23, 24 and 25 are enlarged views of a portion of the bottle cap to illustrate the progressive inward bending of the flange; Figs. 26, 27, 28 and 29 are enlarged detail views of the sealing tool showing the relative positions of the tool and bottle neck, and also the adaptability of the bending tool to various sizes of bottle shoulders; Fig. 30 is a plan view of the sealing tool and cap when the bottle and said tool are eccentric one to the other; Fig. 31 an inward side elevation partly in section of a modified form of the invention; Fig. 32 a vertical section on the plane of the line 32—32 of Fig. 31 looking in the direction of the arrow; Fig. 33 a horizontal section on the plane of the line 33—33 of Fig. 31; Fig. 34 a detail view showing the sealing tool and its coöperating shoe of Fig. 31; Fig. 35 a side elevation partly in section of a further modification; Fig. 36 an enlarged vertical section of the upper part of the machine of Fig. 35; Fig. 37 an inverted plan view of Fig. 36; Fig. 38 a side elevation partly in section of another modification; Fig. 39 an enlarged vertical section of the upper part of the machine of Fig. 38; Fig. 40 an inverted plan view of Fig. 39; Fig. 41 a side elevation partly in section of a modification in which the bending tool is held in a normal position and the bottle moved into contact therewith; Fig. 42 an enlarged section of the head of the machine of Fig. 41; Fig. 43 a vertical section on the plane of the line 43—43 of Fig. 42 and Fig. 44 an inverted plan view of Fig. 42.

Similar reference numerals indicate similar parts in the several views.

Referring to the drawings and particularly to Figs. 1, 2, 12 and 17, the numeral 1 designates the frame of the machine in the form of a casting which has integral therewith at its lower part a bearing for a shaft 2. On said shaft is mounted a loose pulley 3 adapted to receive a belt driven from a power shaft, and also a fast pulley 4. The pulley 3 is brought into operative engagement with the shaft 2 by a suitable clutch controlled by a treadle 5 pivoted on the side of the frame, the upper arm 5′ of said treadle engaging the collar 6 of said clutch. When the treadle is depressed the clutch, in the particular construction used by me, is drawn forward for the purpose stated, and the treadle locked by engagement therewith of an arm 15 fulcrumed on the end of shaft 2. A belt runs from pulley 4 around pulleys 39 and 32 as hereafter described, rotation being imparted to the pulley 4 as will be readily understood when pulley 3 is brought into operative engagement with the shaft 2. A pinion 7 keyed on the shaft 2 meshes with a spur gear 8 mounted on a shaft 9 which is supported in a bearing 10 integral with the frame 1. On the side of the gear 8 is a crank pin 11 to which is connected one end of a pitman 12, the upper end of said pitman being connected to a hollow plunger 13, the latter being free to reciprocate vertically in a longitudinal bearing in an extension 14 of the frame. Upon each complete rotation of the gear wheel 8 a cam projection 16 on one end of pitman 12 engages a lug 15′ on the end of arm 15 to thereby release the treadle 6 which is then raised to its normal position by a spring 17 thereby freeing the pulley 3 from the clutch. A brake shoe 18 fixed to a lever 19 is adapted to engage a brake wheel 20 fixed to the front end of shaft 2, the movement of said shoe being controlled by the treadle through the lever 19 so as to be brought into frictional engagement with the wheel 20 when the treadle is released.

Supported in the hollow plunger 13 is a spindle 21 which carries at its upper end a table 22 upon which the bottle to be capped is placed. The table 22 is provided with a gage 23 to secure the proper centering of the bottle. The spindle 21 is provided with a collar 21′ adjustable thereon by a set screw. An extension of the collar 21′ carries a stop 22′ which rests upon the upper side of the extension 14. When the plunger 13 is raised it strikes against the under side of collar 21′ and thereby raises the bottle for the purpose hereafter described. When the plunger 13 descends the spindle 21 is carried with it until the stop 22′ comes to rest upon the extension 14. If preferred the spindle 21 may be screw-threaded into the plunger 13.

The frame 1 is formed with an integral head 24 bored longitudinally in alinement with the plunger 13. Screw threaded into lugs on the side of said head are vertical rods 25 to which is secured at their upper ends a cross head 26 having a central opening through which passes the reduced upper end 27 of a spindle 28. A flange 29 on the latter is adapted to rest upon the upper end of the head 24 and to thus limit the downward movement of said spindle. Surrounding the end 27 and extending between the head 26 and flange 29 is a spring 30 which in practice exerts a pressure of about 900 to 1,000 pounds on the spindle 28. Threaded into the lower end of spindle 28 is a sleeve 42 formed preferably of steel and split longitudinally for a portion of its length to provide a plurality of laterally yielding spring jaws, (see Figs. 5 and 6), the inner lower walls 42′ of said jaws being concaved to form a suitable working face, as shown in the drawings, to adapt said sleeve, which virtually constitutes a chuck and will be so referred to, to engage the corner of the cap in the manner indicated for example in Fig. 27, when the bottle is forced upward into the chuck. Threaded into the chuck is a core 43 the lower end of which is concaved so that in the capping operation the top of the cap will be slightly convexed as shown in Fig. 28, this convexity assisting in the ready removal of the cap when the bottle is to be opened. The core 43 is however not essential and may be dispensed with.

It is well known that variations occur in the height of bottles and in the form, and diameter of the head, and in the width and thickness of the metal caps, and because of these variations I split the chuck as above stated and make the internal diameter of the working face into which the rim of the bottle is forced, substantially equal to the diameter of the smallest bottle head likely to be met with in practice for the particular machine used. I am thus enabled, notwithstanding variations in the bottle head and in the cap, to uniformly compress the cap about the rim and to conform the cap to the rim by an evenly distributed pressure. The function of the chuck is that of the female member of a die and under the pressure applied to the bottle acting as a punch, the cap will be restamped or reshaped to conform exactly to to the rim of the bottle.

The purpose of the mechanism so far described is to reshape the cap and to conform it to the rim of the bottle and to firmly hold the bottle. I will now describe the mechanism by which the flange of the cap is forcibly bent into close enveloping or locking contact with the shoulder of the bottle head. Screw threaded about the side of the lower end of the spindle 28 is a ring 31, and resting upon said ring and having a loose bearing on its side and also about the spindle 28 is a pulley 32, said pulley having an upwardly extended annular flange 33 in engagement with said spindle. Supported upon extensions of the rods 25 is a ring 34 to which is secured a depending annular flange 35 bearing against the side of the flange 33. The ring 34 and flange 35 may be made in one piece if desired. The lower end of the flange 35 is formed with a beveled or cam face 36 for the purpose hereafter described. Mounted in bearings in a bracket 37 formed integral with the frame 1 is a shaft 38, the axis of which is at right angles to that of pulley 32. The shaft 38 carries pulleys 39, a belt (not shown) passing around the pulley 4 and around both pulleys 39 and pulley 32 to impart a rotary motion to pulley 32 and the parts carried thereby as presently to be described. In order to prevent rotation of spindle 28, it is provided with a longitudinal slot 40 with which engages a stud or pin 41 extending through the head 24.

Supported upon the chuck 42 is a collar 44 (see particularly Figs. 13-16 and Figs. 26-29), capable of vertical adjustment by means of set screws 44'. The collar 44 is tapped to receive screw threaded bolts 45, preferably four in number, said bolts projecting beyond the under side of said collar and supporting spiral springs 46, the pitch of the threads of said bolts and of the convolutions of the springs being equal so that the springs are firmly secured upon the bolts. Into the lower ends of said springs are threaded bolts 47 which are tapped into a ring 48, said ring constituting a flange bending or sealing tool adapted to be pressed against the cap flange as hereafter described. The inner wall 48' of the ring 48 is inclined or curved inwardly from the bottom toward the top, to provide a working edge 49 more or less sharp with which the bending of the flange is effected. To the under side of the ring 48 are secured suitable pins 50 to serve as guides to secure the proper centering of the bottle. These guide pins may if desired constitute the heads of the bolts 47. Instead of guide pins 50 I may employ a semi-circular guide 63 as shown in Figs. 10 and 11, secured to the under side of the bending tool 48.

Rotatably supported in a bearing in the web 51 of pulley 32 is a short vertical shaft 52 having an enlarged head 53 into which is fixed one end of a curved spring arm 54 (see Figs. 4, 7, 8 and 9) which arm at its free end carries a shoe 55 normally resting against the side of flange 33 of pulley 32. The shaft 52 carries at its lower end a collar 56 having an extension 57 in which is supported a vertical depending arm 58. To the arm 58 is secured a laterally projecting curved spring arm 59 which carries at its free end a stud 60 upon which is revolubly mounted a shoe 61, said shoe normally extending in close proximity to the side of ring 48 and adapted when the spring arm 59 is swung inwardly to contact with a circumferential bead 62 formed about the ring.

The operation of the mechanism above described, which is designed to secure a flanged sealing cap to the outside of the bottle head by forcibly bending the flange of a metal cap into locking contact with a shoulder on said head, is as follows:—The bottle to be capped, a portion of the neck 64 of which is shown in the drawings, is properly placed upon the table 22 with a cap 65 thereon, the cap being preferably provided with a sealing disk 66 of cork or other suitable material. The cap in practice is placed on the bottle by hand so that it rests upon the rim with its flange 67 surrounding the shoulder or bead 68 of the bottle neck. With the parts in their normal positions of rest the bending or sealing tool 48 is concentric with the bottle head and out of contact therewith, and the shoe 61 is out of contact with, or if in contact exerting no pressure on the tool 48. The height of the table 22 is usually adjusted so as to bring the neck of the bottle, when the latter is placed thereon, into substantially the position shown in Fig. 26 with relation to the chuck 42 and the tool 48. With the parts in their normal positions the treadle 5 is depressed thereby moving the clutch so as to cause rotation of shaft 2 and the raising of plunger 13 through the pitman connection 12. The rapid movement of plunger 13 has the effect of forcibly impinging the head of the bottle against the chuck 42, the plane of impact extending over the corner of the cap, the internal diameter of the chuck and its configuration being such, relatively to a standard size and shape of bottle and cap, as to effect a reshaping of the cap into exact conformity with the rim of the bottle. The sealing disk 66 is compressed over the rim and the metal of the top of the cap forced into a slightly convex form, as seen in Fig. 27. The capability of lateral adjustment of the chuck is of importance in that all variations from a standard shape and size are provided for thereby securing uniformity of pressure circumferentially around the overlying corner of the cap.

When the bottle head is forced into the chuck as above described the spindle 28 is raised against spring 30 tending to compress the latter until the table 22 reaches its uppermost position at the end of the upward throw of the pitman 12. When the spindle 28 is thus raised it carries with it pulley 32, shaft 52, and the parts connected thereto causing shoe 55 to ride over the cam face 36 of flange 35, thereby pressing the spring arm 54 outward and imparting a slight rotary movement to shaft 52 in its bearing in the web 51. This rotation of shaft 52 swings the arms 58 and 59 inward causing shoe 61 to bear against the bead 62 of the bending or sealing tool 48 and moving the latter laterally into a position eccentric to the bottle and bearing, along the working edge 49, against the flange 67 of the cap. When the clutch is shifted by depressing the treadle as above stated the belt running from pulley 4 over pulleys 39 and 32 will effect the rotation of the latter, such rotary movement causing the shoe 61 to travel about the tool 48 and always maintaining the latter in a position eccentric to the bottle. The pressure exerted by tool 48 is sufficient to bend the flange 67 into secure locking engagement with shoulder 68 so as to present a perfectly smooth edge and without any folding over of the metal. The adjustability of the bending tool 48 is an important feature to be noted in this connection in that provision is thereby made for all irregularities in the height of bottles, and width and height of the shoulders within the range usually met with in practice. The springs 46 are so made as to offer considerable resistance to the pressure exerted by shoe 61 yet they are sufficiently elastic to permit of vertical, lateral and torsional movements of the tool 48 to accommodate said tool to the irregularities of the bottle and shoulder. When the tool 48 is being moved the springs 46 will be distorted somewhat in the manner shown in Figs. 13 to 16, and Figs. 26 to 29, the amount of such distortion depending upon the height and width of the shoulder, the edge 49 in all cases being brought to bear against the under side of the shoulder 68 so as to force the flange of the cap into close locking contact with said shoulder.

The flange 33 of pulley 32 is guided in its vertical movements between spindle 28 and the flange 35, the latter extending far enough downwardly to maintain the spring arm 54 pressed outwardly long enough to permit the travel of shoe 61 at least once around the tool 48. The flange 35 may be made of such length as desired and the size of the pulleys so regulated as to cause the shoe 61 to travel around the tool 48 as many times as desired although it should make at least one complete revolution. It will also be noted that the vertical distance traveled by spring arm 54 before the shoe 55 meets the cam face 36 is such that the full force of the impact between the top of the bottle and the chuck is made effective to reshape the cap before the shoe 61 is moved into contact to displace tool 48.

The precise operations involved in the bending of the cap flange 67 into locking engagement with the shoulder 68 will be clearly understood by reference to Figs. 13 to 25 inclusive. Fig. 13 shows the position of the bottle immediately before being forced into engagement with chuck 42. The movement of the shoe 61 against the bending tool 48 is effected immediately after the bottle head engages the chuck, the parts being so related that a point on the working edge 49 will be brought to bear against the cap flange opposite the shoulder 67 at some point between the center and lower lines of said shoulder, and by reason of the pressure exerted by the shoe 61, and the elasticity of the springs 46 the said working edge will slide downwardly over the cap flange so as to bend the edge thereof at that point under the shoulder 68. Starting from that position the flange will be bent by a gradually progressive inward and downward movement of successive points on the edge 49 as the shoe 61 travels about the tool 48. When the working edge 49 meets the flange 67 in the manner above stated, the pressure exerted by said edge is not a direct lateral thrust at right angles to the vertical axis of the bottle but a shearing movement exerted upon successive points of the flange, so that the metal after bending presents a continuous smooth surface without folds. The pressure exerted by the shoe 61 on the bending tool tends to tilt the latter slightly out of a horizontal plane, the lowest point of the working edge being that directly inside of the point of contact of said shoe against the periphery of the tool 48, and the highest point diametrically opposite. The point of maximum pressure of the cap flange is therefore along the lowest line of the shoulder 68, or at or near the edge of the cap flange.

The gradual application of the pressure of the working edge 49 against the cap flange is best illustrated in Figs. 17 to 25 inclusive, it being remembered that Fig. 17 is an inverted plan view and that Figs. 18, 19, 20 and 21 are sections on the planes of the lines 1—1, 2—2, 3—3, and 4—4 respectively of Fig. 17. Starting from the position 1—1 it will be seen from Fig. 18 that the bending tool is out of contact with the cap flange on that plane, the point $a$ of the working edge 49 lying in that plane being at about the position shown in Fig. 22 above the edge of the flange. When the shoe 61 is moved through one-third of the quadrant the point $a$ from which we started will be moved inwardly and downwardly in the plane of the line 2—2, so that the tool 48 will exert a very slight pressure on the cap flange bending it as indicated in Figs. 19 and 23, the point of application being at about the position shown in the latter figure above the edge of the flange. A further movement of like extent of the shoe 61 will bring the point $a$ still further inward and downward in the plane of the line 3—3 so that the bending tool will exert a greater pressure on the cap flange as indicated in Figs. 20 and 24. The final movement in the quadrant will bring the point $a$ to the plane of the line 4—4. This is its lowest position, at or very close to the edge of the cap flange and the position of maximum pressure upon the flange as indicated in Figs. 21 and 25. It will thus be seen that when the bending tool 48 is in working position its plane is inclined at a slight angle to a horizontal plane, and that it has imparted to it a nutating movement about the bottle neck. There is no rotation of the tool 48 about its axis except what slight movement there may be due to the torsional pressure exerted by the shoe 61, and it will be observed by reason of this torsional force the springs 46 will be slightly distended as indicated in Figs. 14 to 16, and 17 to 29, thereby lessening the vertical distance between the tool 48 and its supporting ring 44 affording an upward pull on said tool so as to maintain an upward pressure against the cap flange on the under side of the shoulder 68. The bending of the cap flange is therefore due to the resultant force exerted upon the bending tool 48 by the circumferential travel of the shoe 61 about said tool which tends to force a given point on its working edge 49 inwardly and downwardly on an inclined path, and the tension of the springs 46 exerted in an upward direction. These forces act upon the outer side of the cap flange opposite the under side of shoulder 68 the resultant pressure being gradually applied along a given line until it reaches its maximum. This pressure progressively applied around the cap flange effects the bending without folding or breaking of the metal. The capability of yielding vertically or laterally, through the supporting springs 46, enables the bending tool 48 to readily adjust itself to variations in the height of bottles, width of heads, and height and thickness of the shoulders. Perfect sealing results notwithstanding these commonly met variations. For example, assuming that the bottle head shown in Fig. 27 is of standard size and form any variation therefrom as shown in Fig. 28 will still permit the bending tool to assume its proper working position. Furthermore this yielding capability removes all danger of breaking of the bottle and undue straining of the parts of the machine immediately connected with the bending tool. This feature of utility is also contributed to by the spring arms 54 and 59.

In Figs. 31 to 34 several modifications of the machine previously described are illustrated. In these figures a shaft 69 to which is fixed a driving pulley 70 is supported in bearings in the frame 1. A bevel gear 71 on the end of said shaft meshes with a similar gear 72 the latter having a hub 73 surrounding a hollow spindle 74 and having a bearing in an extension 75 of the frame 1. The mechanism in the lower part of the frame may be similar to that described in connection with Figs. 1 to 4, the spindle 74 being supported in vertical alinement with the table 22 and the lower end thereof constituting a chuck in all respects similar to that previously described. The upper end of spindle 74 passes through an opening in an extension 76 of the frame 1 and has secured thereto a collar 77 adapted to rest upon said extension, the construction permitting a vertical movement of the spindle when the bottle is forced into the chuck as will be readily understood. Vertical rods 78 pass through the extension 76 and are bolted to a cross head 79. Between said collar 77 and the cross head 79, and surrounding a plunger 90 hereafter described, is a spring 81 having the same function as the spring 30 of Figs. 1 to 4.

The spindle 74 is formed with or has secured thereto a ring 74' from which is suspended a bending tool 48 constructed as heretofore described except that it is formed with an outer bevel face 82 above the cylindrical body portion thereof. For the purpose of moving the bending tool into a position eccentric to the bottle, I provide a projecting arm 83 which is fixed to the hub 73. Fixed in an opening in the outer end of said arm is a short vertical shaft 84, and extending laterally therefrom and having a slight rotary movement on said shaft is an arm 85 which arm, as shown in Fig. 34, is forked at its outer end and supports a spindle in which is revolubly mounted a shoe 86. Said shoe has a bevel face 86', the inclination of which corresponds to that of the face 82 of the bending tool 48. That part of the arm 85 which encircles the shaft 84 is cut out at 85' forming a radial recess through which projects a pin 87 threaded into an opening in the shaft 84. Secured to the shaft 84 is a collar 88 to which is fixed one end of a spring 89 surrounding said shaft and having its other end fixed to the arm 84. Said spring is so mounted as to tend to throw the arm 85 inward and to maintain the bevel face 86' of the shoe 86 normally in contact with the corresponding face 82 of the bending tool 48, as indicated in Figs. 33 and 34. When the spindle 74 is raised by the impact of the bottle against the chuck 42, the bending tool 48 will be carried with it the bevel face 82 riding over the face 86' of the shoe 86 until the cylindrical face of the bending tool bears against the cylindrical face of the shoe 86, the effect being to move the bending tool laterally to a position eccentric to the bottle. The rotation of the gear 72 and its attached arm 83 will cause the shoe 86 to travel around the bending tool in contact therewith to effect the bending of the cap flange into locking engagement with the shoulder on the bottle neck in a manner similar to that heretofore fully described. The tension of the spring 89 is such as to cause the shoe 86 to exert sufficient pressure against the bending tool to effect the desired bending of the flange, any irregularities in the shoulder or bottle neck being compensated for by the movement of the arm 85 permitted by the opening 85', it being noted that the inner movement of the arm 85 is limited by the pin 87 bearing against the side wall of said opening. The tension of the spring 89 may be regulated by adjustng the angular position of the collar 88 by means of a set screw 88'.

It is sometimes necessary or desirable to provide the present machine with means to force the bottle from the chuck after the sealing operation. For this purpose I have shown a plunger 90 extending longitudinally through the hollow spindle 74 the lower end projecting far enough into the face of the chuck as to rest upon the cap so as to be raised when the bottle is forced into the chuck. The plunger 90 is supported upon the cross head 79 by a collar 91 fixed to said plunger. The plunger 90 has therefore a vertical movement independent of the vertical movement of the spindle 74, the parts being so related that the bottle contacts with the plunger to raise it before impinging against the working face of the chuck. Pivoted on a stud in an opening in the side of the spindle 74 is a latch, the depending arm of which is adapted to take under a projection 93 on the plunger when the spindle is raised after the upward movement of the plunger. The spring 81 acts to lower the spindle 74 to its normal position as soon as the upward pressure on the bottle is released by the return movement of the pitman 12, and should the bottle remain suspended in the clutch the downward movement of said spindle will release the plunger by causing the upper projecting arm 94 of the latch to contact with a stop pin 95 supported in a bracket 76' projecting from the extension 76 thereby throwing the other arm 92 of the latch out of engagement with the projection 93. The plunger thus being free will fall and striking on top of the cap will force the bottle from the chuck. If necessary a weight 96 may be attached to increase that of the plunger.

In Figs. 35 to 37 I have illustrated another embodiment of the invention in which the chuck is held rigidly against vertical movement. In this form the mechanism located in the lower part of the frame is the same as that described with reference to Figs. 1 to 4 except that inasmuch as the chuck is held rigidly against vertical movement the spring cushion to take the force of the impact of the bottle against the chuck consists of a spring 97 surrounding the spindle 21 and held between the top of plunger 13 and a collar 98 on said spindle. In this case the spindle 21 is screw threaded into a bushing in the upper part of the plunger 13 as shown in Fig. 35.

The head 24 forming an extension of the frame 1 is bored longitudinally and fixedly secured therein by a screw 99 or other suitable means, is a spindle 100 the lower end of which is split and constitutes a chuck 100' similar to and having the same function as that heretofore described. The flange bending tool 48 is supported upon the spindle 100 also in the manner heretofore described, the particular form shown being similar to that of Figs. 31 to 34. The shoe 86 is supported upon an arm 85 also similar to that of said figures. The relative arrangement of the several parts is, however, different owing to the immovability of the spindle 100 in a vertical direction. The shaft 84 upon which the shoe 86 is carried through arm 85, instead of being secured to a vertical shaft 84, as in Fig. 32, is screw threaded into the web of a pulley 101, said pulley having a hub 102 which surrounds and bears upon the spindle 100 and is capable of vertical movement thereon. The upper part of the frame 1 is provided with oppositely disposed openings shown in Fig. 36, and through said openings a lever 103 is passed said lever being pivoted on a stud fixed to the frame. Both ends of said lever are made U-shaped the forks being slotted as indicated in Figs. 35 and 36, the slots of the right-hand end being engaged by pins or studs 104 secured to a vertical rod 105 which is guided vertically by brackets 106 extending from the frame 1. Said rod near its lower end carries a shoe 107 which rests upon a cam 108 secured to the outer projecting end of the shaft 9. The slots of the forks of the left-hand end of lever 103 are engaged by pins 109 projecting from a collar 110 set into and having a loose bearing on the hub 102 of pulley 101. The cam 108 is so adjusted that it will operate to raise rod 105 immediately after the pitman 12 has reached the limit of its upward throw so as to lower pulley 101 immediately after the bottle is forced into the chuck. Such downward movement of pulley 101 will lower the shoe 86 so that it will bear against the bending tool 48 to move it laterally to a position eccentric to the bottle and with its working edge in contact with the cap flange. A belt (not shown) passes from pulley 4 around pulleys 39 and around pulley 101 so as to effect the rotation of the latter to cause the travel of shoe 86 around and in contact with the bending tool 48 to effect the bending of the flange in precisely the same manner as heretofore described.

The upper end of rod 105 carries a shoe 111 which, when said rod is raised by the cam 108, rides over the face of the depending arm 112' of a lever 112 fulcrumed on a stud on the top of the frame 1. The other end of said lever is forked as indicated in Fig. 36 and receives a stud upon which is supported a plunger 113 which passes through the longitudinal bore of spindle 100, said plunger extending down into the face of chuck 42. The function of the plunger 113 is to release the bottle from the chuck in the manner described in connection with Fig. 32. When the bottle is forced into the chuck the plunger 113 is raised thereby rocking lever 112 on its fulcrum and moving the depending arm 112' thereof inward and causing it to ride downwardly against shoe 111. At the same time the said shoe has a movement of its own upward by reason of the raising of the rod 105. The lever 112 is, therefore, held in a raised position by the pressure of the shoe 111 against the side of arm 112' and is released when the rod 105 is lowered. When so released a spring 114 secured to said lever and to the frame will draw said lever downward causing the plunger 113 to strike against the cap to release the bottle from the chuck. A spring 115 surrounds the rod 105 and is held between a collar 116 and one of the brackets 106 as shown in Fig. 35, the function of said spring being to lower rod 105 when the high point of cam 108 wipes from under the shoe 107. The use of a plunger to force the bottle from the chuck is not absolutely necessary or essential it being shown merely as a feature which may be employed because in practice the flexibility of the spring jaws of the chuck will usually be sufficient to eject the bottle as soon as the longitudinal pressure against the bottle is released. One essential function of the chuck heretofore described is to hold the cap flange in close enveloping contact with the rim of the bottle so that during the operation of bending the flange the metal will be prevented from buckling. This results from the concavity of the working face of the chuck which covers the corner of the cap, extending not only a slight distance over the crown but alongside the upper part of the flange.

The machine of Figs. 38, 39 and 40 is in its main feature similar to that of Figs. 35 to 37, the differences being as follows:—Adjustably secured to the spindle 100 above the bending tool 48 is a collar 117 between which and a collar 118 slidably keyed to said spindle is a spring 119. The pulley 101 is supported upon collar 118 the web of said pulley having an opening in which is secured a depending arm 120 said arm having a vertically projecting stud from the lower end thereof on which is revolubly mounted a shoe 121. The shoe 121 is in the form of a frustum of a cone the face of which is adapted, when pulley 101 is lowered, to bear against the side of the bending tool to move it laterally into its described eccentric position. To effect the downward movement of pulley 101 lever 103 engages the pins 109 which in this instance are secured to a collar 122 having a loose bearing in a ring 123, which ring has a loose bearing on spindle 100. The ring 123 is formed with a downwardly projecting annular flange 124 which is of greater diameter than the body of the ring and extends between two annular flanges 125 projecting upwardly from the web of pulley 101, the inner of said flanges 125 having a loose bearing on spindle 100. The flange 124 rests upon a spring 126 which surrounds the inner of the flanges 125 and bears against the web of pulley 101. When lever 103 is rocked on its pivot by the upward movement of rod 105 the outer end thereof is depressed thereby lowering pulley 101 by the depression of flange 124 against spring 126. This movement will cause shoe 121 to move the bending tool laterally, the bending of the cap flange being effected by the travel of said shoe in circumferential contact with said tool in the manner before described. Pulley 101 which carries the shoe 121 is rotated by a belt (not shown) as in the case of the machine of Figs. 35–37. The function of spring 119 is to raise pulley 101 to its normal position shown in Fig. 39 after the completion of the sealing operation.

In all of the forms of the invention heretofore described the bending tool 48 is moved from its normal position to a position eccentric to the bottle, and the cap flange bent into locking engagement with the bottle by moving said tool in such manner that successive points on its working edge will exert a gradually increasing pressure on said flange, the bottle remaining stationary. It is equally within my invention to reverse these conditions, that is, to hold the bending tool stationary and to move the bottle into a position eccentric to said tool and then roll it against the working edge 49. One embodiment of this equivalent mode of operation is illustrated in Figs. 41 to 44. In these figures the machine in the lower part of the frame is or may be the same as described with reference to preceding machines except that a ball and socket connection 140 is made between the spindle 21 and table 22 as indicated in Fig. 41 to permit a movement of the table corresponding to the movement of the neck of the bottle so that the bottle may bear squarely upon the table.

The bending tool 48 in the present case is freely supported upon spring arms 127 secured to a bracket 128 extending from the frame 1 in such manner that it will retain its normal position except for such lateral vertical or torsional movements as may be caused by contact of the bottle neck therewith during the sealing operation. Having a bearing on an annular flange 129 of the bracket 128 is a bevel gear 130 which meshes with a similar gear 131 fixed to a shaft having bearings in the frame 1 and rotated by a pulley 132 driven from shaft 2. The hub of gear 130 is eccentrically bored as seen by reference to Fig. 42, the opening being also eccentric to the axis of the bending tool. In said opening is seated a chuck 132 which is also eccentric to the axis of the bending tool and is always so maintained. The chuck 132 is formed with a concaved working face adapted to receive the impact of the bottle about the corner of the cap, the bottle being forced into the chuck upon the upward throw of the pitman 12. The chuck and bending tool being always in an eccentric relation the flange bending operation begins immediately the bottle is forced into the chuck, the desired movement of the bottle being effected as follows: The chuck 132 is provided with a transverse opening 133 which is enlarged at its lower end to receive the head of a pin 134, which pin projects above the upper end of the chuck and extends through an opening 135 in a depending head 136 forming part of or secured to a bracket 137 attached to the frame 1. The opening 135 extends at right angles to the opening 133, and to the upper end of pin 134 is secured a block 138 adapted to slide in an opening 139 in the head 136. A suitable anti-friction bearing is provided between the head 136 and chuck 132 as indicated in Fig. 42.

The operation of the last described machine is as follows. The upward movement of the bottle brings the cap flange at one point into engagement with the working edge 49 of the bending tool 48 as shown in Figs. 42 and 44. Beginning at that point the cap flange will be bent into locking engagement with the shoulder on the bottle head by a gradual progressively applied pressure in the same manner as described in connection with the preceding machines. That is to say, as the gear 130 is rotated no rotary movement will be imparted to the chuck 132, but the latter, which holds the bottle firmly about the corner of the cap, has a movement in the path of an eccentric by reason of the engagement of pin 134 with the walls of the openings 133 and 135, the result being that the bottle neck will be pressed against the working edge 49 of the bending tool so as to bring successive points on the circumference of the cap flange into engagement with said edge to effect the bending of the flange beneath the shoulder on the bottle neck. From the manner of suspending the bending tool on the spring arms 127 the said tool is capable of vertical, lateral and torsional movements so as to accommodate itself to various conditions and irregularities in the height and width of shoulders, perfect sealing resulting notwithstanding the variations heretofore referred to.

In describing the movement of the bending tool during the sealing operation conditions are assumed which are usually met with in practice. The machines are so adjusted as to meet ordinary commercial conditions which present variations in the forms and sizes of bottles and shoulders. This requires an adjustment within certain limits which will cause the edge 49 of the bending tool, when the latter is brought into working position, to contact with the cap flange somewhat above the lower line of the shoulder and above the edge of the flange, the said edge being then moved down to about the lower line of the flange and successive points brought into position to effect the bending of the flange as described. As it is not necessary to have more metal in the flange than sufficient to be bent against the under side of the shoulder it may happen sometimes that the bending tool in its initial movement will strike the flange at or very near its edge. In such case the bending tool instead of having a nutating movement may move in the path of an eccentric in a substantially horizontal plane.

It will be seen from the above description that the chuck may be held rigidly against vertical movement, or provided with means which will permit it to yield vertically when the bottle is forced into it. Also the bending tool may be supported on the chuck so as to have no vertical movement except that permitted by the springs 46. In other words, to effect the lateral movement of the bending tool into a position eccentric to the bottle, the said tool may be moved so as to meet the shoe which effects such lateral movement, or said shoe may be moved relatively to the bending tool.

By "cap flange" as used in the present specification is meant that part of the cap which extends below the crown whether in a continuous circumferential line or not, thereby including projecting members or tongues or other parts of the cap adapted to be bent into locking engagement with the bottle head.

What I claim and desire to secure by Letters Patent is:—

1. In a bottle sealing machine the combination of a bottle support, a chuck having laterally yielding jaws in alinement with said support, means to force the bottle into engagement with said chuck, and a non-rotary flange bending tool.

2. In a bottle sealing machine the combination of a bottle support, a laterally yielding chuck in alinement with said support, means to force the bottle into engagement with said chuck, a non-rotary flange bending tool, and means to actuate said tool after the bottle has been forced into the chuck.

3. In a bottle sealing machine the combination of a tool adapted to bend the flange of a sealing cap into locking engagement with a bottle head, and a universal support for said tool whereby it may be moved in any direction to accommodate itself to irregularities and variations in the size and shape of bottles and caps.

4. In a bottle sealing machine the combination of a tool adapted to bend the flange of a sealing cap into locking engagement with a bottle head, freely suspended spring supports for said tool, and means for bringing said tool and the bottle to be capped into engagement with each other for the purpose described.

5. In a bottle sealing machine the combination of a tool adapted to bend the flange of a sealing cap into locking engagement with a bottle head, and means to impart a relative movement of nutation between said tool and bottle to effect the bending of the flange.

6. In a bottle sealing machine the combination of a tool adapted to bend the flange of a sealing cap into locking engagement with a bottle head, means for maintaining said tool and bottle in an eccentric relation one to the other during the sealing operation, and means to impart a relative movement of nutation between said tool and bottle to effect the bending of the flange.

7. In a bottle sealing machine the combination of a tool adapted to bend the flange of a sealing cap into locking engagement with a bottle head, means to move said tool and bottle into engagement with each other, and means to effect the bending of the flange by an inwardly and downwardly applied pressure along successive lines of said flange.

8. In a bottle sealing machine the combination of a tool adapted to bend the flange of a sealing cap into locking engagement with a bottle head, freely suspended spring supports for said tool, and means to move said tool into contact with the cap flange and eccentric to the bottle head and while so maintained to produce a relative movement between said tool and bottle to effect the desired bending of the cap flange.

9. In a bottle sealing machine the combination of a movably supported tool adapted to bend the flange of a sealing cap into locking engagement with the bottle head, a shoe and means to actuate the same to bear against said tool to move the latter to a position eccentric to the bottle head, and means to revolve said shoe about said tool while in bearing contact therewith for the purpose described.

10. In a bottle sealing machine the combination of a chuck into which the head of the bottle is adapted to be forced, a tool adapted to bend the flange of a sealing cap into locking engagement with a bottle head, a ring supported on said chuck, and yielding suspension means secured to said ring and freely supporting said tool below the chuck.

11. In a bottle sealing machine the combination of a chuck into which the bottle is adapted to be forced, a ring supported on said chuck, vertically depending springs secured to said ring, a second ring supported by said springs below the chuck, said latter ring constituting a tool adapted to bend the flange of a sealing cap into locking engagement with a bottle head, and means to move said tool into operative engagement with the cap flange.

12. In a bottle sealing machine the combination of a tool adapted to bend the flange of a sealing cap into locking engagement with a bottle head, said tool consisting of a ring having an inner working edge, means to move said tool into operative engagement with the cap flange, a chuck having laterally yielding jaws adapted to reshape the cap to conform to the rim of the bottle, and means to force the bottle into said chuck.

13. In a bottle sealing machine the combination of a non-rotative spindle, a chuck secured to said spindle, a tool adapted to bend the flange of a sealing cap into locking engagement with a bottle head, said tool being movably suspended below said chuck and consisting of a ring having an inner indenting edge, a shoe and means to move the same into bearing contact with said tool for the purpose described.

14. In a bottle sealing machine the combination of a movably supported tool adapted to bend the flange of a sealing cap into locking engagement with a bottle head, a shoe, means to produce a relative movement between said tool and shoe so as to position the bending tool eccentric to the bottle, and means to cause said shoe to travel circumferentially about said tool with a bearing contact.

15. In a bottle sealing machine the combination of a tool adapted to bend the flange of a sealing cap into locking engagement with a bottle head, means for suspending said tool so that it is capable of lateral, vertical and torsional movements, and means to bring successive points on said tool into bearing contact with the cap flange for the purpose described.

16. In a bottle sealing machine the combination of a chuck into which the bottle is adapted to be forced, a flange bending tool movably supported below said chuck and means for imparting to said tool a movement of nutation about the bottle head in bearing contact with the cap flange.

17. In a bottle sealing machine the combination of a bottle support, a chuck in alinement with said support, said chuck having a face adapted to receive the head of the bottle with a sealing cap thereon, a laterally yielding flange bending tool comprising a ring adapted to encircle the bottle head, and means for actuating said tool to effect the desired bending of the cap flange.

18. In a bottle sealing machine the combination of a bottle support, a chuck in alinement with said support, means to force the bottle into said chuck by a longitudinally applied pressure to compress the cap on the rim of the bottle head, said chuck having a face adapted to receive the head of the bottle with a sealing cap thereon, a laterally yielding flange bending tool comprising a ring adapted to encircle the bottle head, and means for actuating said tool to effect the desired bending of the cap flange.

19. In a bottle sealing machine the combination of a tool adapted to bend the flange of a sealing cap into locking engagement with a bottle head, spring supports for said tool, and means to move said tool into contact with the cap flange and eccentric to the bottle head and while so maintained to produce a relative movement between said tool and bottle to effect the desired bending of the cap flange.

20. In a bottle sealing machine the combination of a tool adapted to bend the flange of a sealing cap into locking engagement with a bottle head, said tool consisting of a spring suspended ring having a continuous inner indenting edge and means for producing a relative movement between said tool and the bottle so as to bend successive points of the cap into such locking engagement, that part of said tool acting on the cap being a portion of a circumference of greater diameter than the diameter of the bottle head being sealed.

21. In a bottle sealing machine the combination of a tool adapted to bend the flange of a sealing cap into locking engagement with a bottle head, means for producing a relative movement between said tool and the bottle so as to bend successive points of the cap into such locking engagement, that part of said tool acting on the cap being a portion of a circumference of greater diameter than the diameter of the bottle head being sealed, and means for supporting said tool so that it may have vertically and laterally yielding movements.

22. In a bottle sealing machine the combination of a tool adapted to bend the flange of a sealing cap into locking engagement with a bottle head, a chuck having laterally yielding jaws, and means for producing a relative movement between said tool and the bottle so as to bend successive points of the cap into such locking engagement, that part of said tool acting on the cap being a portion of a circumference of greater diameter than the diameter of the bottle head being sealed.

23. In a bottle sealing machine the combination of a chuck adapted to reshape the sealing cap so as to conform to the rim of the bottle, means to force the bottle into said chuck, a flange bending tool, and means for imparting to said tool a movement of nutation about the bottle head in bearing contact with the cap flange.

24. In a bottle sealing machine the combination of a bottle support, a chuck in alinement with said support, said chuck comprising a plurality of laterally yielding jaws adapted to receive the impact of the bottle about the corner of the cap, a flange bending tool, and means for imparting to said tool a movement of nutation about the bottle head in bearing contact with the cap flange.

25. In a bottle sealing machine the combination of a bottle support, a chuck in alinement with said support, said chuck consisting of a sleeve split longitudinally and having a concaved working face around the inner lower wall thereof adapted to receive the impact of the bottle about the corner of the cap, the diameter of said working face being substantially equal to the diameter of the bottle neck adapted to the machine, means to force the bottle into engagement with said chuck, a flange bending tool, and means for imparting to said tool a movement of nutation about the bottle head in bearing contact with the cap flange.

26. In a bottle sealing machine the combination of a bottle support, a chuck having laterally yielding jaws in alinement with said support, means to force the bottle into engagement with said chuck, a flange bending tool, and means for imparting to said tool a movement of nutation about the bottle head in bearing contact with the cap flange.

27. In a bottle sealing machine the combination of a bottle support, a chuck in alinement with said support, said chuck having laterally yielding jaws, means to force the bottle into engagement with said chuck, a non-rotary flange bending tool, and means to actuate said tool after the bottle has been forced into the chuck.

28. In a bottle sealing machine the combination of a bottle support, a chuck having laterally yielding jaws, a tool adapted to bend the flange of a sealing cap into locking engagement with the bottle head, said tool comprising a ring, and means to force successive points of said tool against the cap flange.

29. In a bottle sealing machine the combination of a bottle support, a chuck having a face adapted to receive the head of the bottle with a sealing cap thereon, a tool adapted to bend the flange of a sealing cap into locking engagement with the bottle head said tool having a continuous inner working edge, and means for exerting a yielding lateral pressure on the cap flange during the sealing operation.

30. In a bottle sealing machine the combination of a bottle support, a chuck in alinement with said support, said chuck having a face adapted to receive the head of the bottle with a sealing cap thereon, means to force the bottle into said chuck by a longitudinally applied pressure to compress the cap on the mouth of the bottle, a tool adapted to bend the flange of the cap into locking engagement with the bottle head said tool comprising a ring adapted to encircle the bottle head, and means for exerting a yielding lateral pressure on the cap flange during the sealing operation.

31. In a bottle sealing machine the combination of a tool adapted to bend the flange of a sealing cap into locking engagement with a bottle head, a universal support for said tool whereby it may be moved in any direction to accommodate itself to irregularities and variations in the size and shape of bottles and caps, and a chuck adapted to receive the bottle head.

32. In a bottle sealing machine the combination of a tool adapted to bend the flange of a sealing cap into locking engagement with a bottle head, a universal support for said tool whereby it may be moved in any direction to accommodate itself to irregularities and variations in the size and shape of bottles and caps, a chuck having a face adapted to receive the head of the bottle with the sealing cap thereon, and means for exerting a yielding lateral pressure on the cap flange during the sealing operation.

33. In a bottle sealing machine the combination of a tool adapted to bend the flange of a sealing cap into locking engagement with a bottle head, means to maintain said tool and the bottle to be sealed in positions eccentric one to the other, means to produce a relative movement between said tool and bottle whereby successive points on the working edge of the bending tool are caused to bear against the cap flange, a chuck having a face adapted to receive the head of the bottle with a sealing cap thereon, and means for exerting a yielding lateral pressure on the cap flange during the sealing operation.

34. In a bottle sealing machine the combination of a tool adapted to bend the flange of a sealing cap into locking engagement with a bottle head, means to maintain said tool and the bottle to be sealed in positions eccentric one to the other, means to produce a relative movement between said tool and bottle whereby successive points on the working edge of the bending tool are caused to bear against the cap flange, a chuck having a face adapted to receive the head of the bottle with a sealing cap thereon, means to force the bottle into said chuck by a longitudinally applied pressure to compress the cap on the mouth of the bottle, and means for exerting a yielding lateral pressure on the cap flange and for maintaining the cap and bottle under vertical compression during the sealing operation.

35. In a bottle sealing machine the combination of a tool adapted to bend the flange of a sealing cap into locking engagement with a bottle head said tool consisting of a ring having an inner indenting edge, means to move said tool in the direction of longitudinal movement of the bottle when the latter is being forced into sealing position, and means to move said tool against the cap flange to effect the desired bending thereof.

36. In a bottle sealing machine the combination of a tool adapted to bend the flange of a sealing cap into locking engagement with a bottle head, means to move said tool in the direction of longitudinal movement of the bottle when the latter is being forced into sealing position, and a shoe in the path of said tool when the latter is so moved and adapted to move and maintain the tool in a position eccentric to the bottle head.

37. In a bottle sealing machine the combination of a tool adapted to bend the flange of a sealing cap into locking engagement with a bottle head, means to move said tool in the direction of longitudinal movement of the bottle when the latter is being forced into sealing position, a shoe in the path of said tool when the latter is so moved and adapted to move and maintain the tool in a position eccentric to the bottle head, and means to rotate said shoe about said tool while in bearing contact therewith.

38. In a bottle sealing machine the combination of a tool adapted to bend the flange of a sealing cap into locking engagement with a bottle head, means to move said tool in the direction of longitudinal movement of the bottle when the latter is being forced into sealing position, said tool having its outer face beveled, and a coöperating shoe having a similar face adapted when the said tool is moved against it of forcing and maintaining said tool in a position eccentric to the bottle head.

39. In a bottle sealing machine the combination of a bottle support, a vertically yielding chuck in alinement with said support, and a flange bending tool suspended from springs below the face of said chuck.

40. In a bottle sealing machine the combination of a vertically yielding chuck, a ring or collar secured to the chuck, suspended springs pendent from said ring or collar, a flange bending tool secured to the lower ends of said springs below the face of said chuck, means to move said tool laterally into a position eccentric to the bottle head, and means to force successive points on said tool against the cap flange while maintained in its said eccentric relation.

41. In a bottle sealing machine the combination of a tool adapted to bend the flange of a sealing cap into locking engagement with the bottle head, means to move said tool laterally into a position eccentric to the bottle head and against the cap flange comprising a shoe, a laterally yielding arm to which said shoe is secured, and means to cause said shoe to travel about the circumference of said tool while in bearing contact therewith.

42. In a bottle sealing machine the combination of a movably supported tool adapted to bend the flange of a sealing cap into locking engagement with the bottle head, said tool consisting of a ring having an inner indenting edge normally concentric with the bottle head, a shoe and means to actuate the same to bear against said tool to move the latter to a position eccentric to the bottle head, and means to revolve said shoe about said tool while in bearing contact therewith.

43. In a bottle sealing machine the combination of a tool adapted to bend the flange of a sealing cap into locking engagement with the bottle head, said tool consisting of a ring having an inner indenting edge normally concentric with the bottle head, freely suspended spring supports for said tool, means to move said tool against the bottle head in a position eccentric thereto, and means for pressing successive points on the indenting edge of said tool against the cap flange while such eccentric relation is maintained.

44. In a bottle sealing machine the combination of a tool adapted to bend the flange of a sealing cap into locking engagement with a bottle head, said tool consisting of a ring having an inner indenting edge, spring supports for said tool, means to position said tool and the bottle to be sealed in an eccentric relation one to the other, and means to produce a relative movement between said tool and the bottle to effect the desired bending of the flange.

45. In a capping machine or the like, a tool having an annular working face, and means for imparting a circular swinging movement to such tool, whereby such face is tilted and its successive portions are brought into contact with the work.

46. In a capping machine or the like, a tool having an annular working face, and means for imparting a circular swinging movement to such tool, whereby such face is tilted and its successive portions are brought into contact with the work, and means for varying the extent of such swinging movements.

47. In a capping machine or the like, a tool having an annular working face, means for mounting such tool adapted to permit it to swing in a circular path around a cap, and a rotary member for swinging said tool.

48. In a capping machine or the like, the combination of a tool having an annular working face, and means for imparting a circular tilting movement to said tool to bring such face into contact with the work.

49. In a capping machine or the like, the combination of a tool having an annular working face, and means for progressively bringing the successive portions of such face into contact with the work while varying the plane in which such face acts during its operation.

50. In a machine for bending metal flanges or the like, an annular tool, means for imparting circular swinging movements thereto, and means for varying the extent of such movements.

51. In a machine for bending metal flanges or the like, the combination of a tool having an annular working face, and means for progressively bringing the successive portions of such face into contact with the work while progressively advancing such face nearer to the work.

In witness whereof I have hereunto signed my name in the presence of two subscribing witnesses.

ALFRED L. WEISSENTHANNER.

Witnesses:
OLIN A. FOSTER,
GRACE L. HEASLEY.